(12) United States Patent
Chang

(10) Patent No.: US 9,590,716 B2
(45) Date of Patent: Mar. 7, 2017

(54) TRANSMISSION, RECEPTION AND SYSTEM USING MULTIPLE ANTENNAS

(71) Applicant: Intellectual Discovery Co., Ltd., Seoul (KR)

(72) Inventor: Seok-Ho Chang, Seoul (KR)

(73) Assignee: INTELLECTUAL DISCOVERY CO., LTD., Seoul (KR)

(*) Notice: Subject to any disclaimer, the term of this patent is extended or adjusted under 35 U.S.C. 154(b) by 353 days.

(21) Appl. No.: 14/264,816

(22) Filed: Apr. 29, 2014

(65) Prior Publication Data
US 2014/0321557 A1  Oct. 30, 2014

(30) Foreign Application Priority Data

Apr. 30, 2013 (KR) .................. 10-2013-0048928
Apr. 30, 2013 (KR) .................. 10-2013-0048929

(51) Int. Cl.
 *H04J 3/00* (2006.01)
 *H04B 7/06* (2006.01)
 (Continued)

(52) U.S. Cl.
 CPC ........ *H04B 7/0697* (2013.01); *H04B 7/0669* (2013.01); *H04L 1/007* (2013.01);
 (Continued)

(58) Field of Classification Search
 CPC .. H04B 7/0413; H04B 7/0456; H04B 7/0697; H04B 7/0669; H04L 5/0007; H04L 5/0023; H04L 1/007; H04L 1/0625; H04L 1/0631; H04W 72/042; H04W 84/12; H04W 88/08; H04W 72/0413; H04W 72/044;
 (Continued)

(56) References Cited

U.S. PATENT DOCUMENTS

| 5,914,950 A * | 6/1999 | Tiedemann, Jr. ....... H04L 47/10 370/335 |
| 2006/0203711 A1* | 9/2006 | Oh ..................... H04L 1/0668 370/208 |

(Continued)

OTHER PUBLICATIONS

Heath Jr, Robert W., and Arogyaswami J. Paulraj. "Switching between diversity and multiplexing in MIMO systems." Communications, IEEE Transactions on 53.6 (2005): 962-968.*

*Primary Examiner* — Allen Wong
(74) *Attorney, Agent, or Firm* — Rabin & Berdo, P.C.

(57) ABSTRACT

The present disclosure in some embodiments provides transmission, reception and an apparatus using multiple antennas. A transmission apparatus in an embodiment may include first to M-th transmission antennas, where M is a natural number≥2; first to L-th encoders, where L is a natural number≥2; and first to M-th transmission signal generators. The l-th encoder (where l=arbitrary natural number between 1 and L) receives an l-th symbol sequence and generates first to M-th encoded symbol sequences by encoding the received l-th symbol sequence according to an l-th multiple antenna transmission scheme. The m-th transmission signal generator (where m=arbitrary natural number between 1 and M) combines m-th encoded symbol sequences generated by the encoders to generate a signal to be transmitted via the m-th transmission antenna.

20 Claims, 9 Drawing Sheets

(51) Int. Cl.
*H04N 19/37* (2014.01)
*H04N 19/66* (2014.01)
*H04L 1/00* (2006.01)
*H04L 1/06* (2006.01)

(52) U.S. Cl.
CPC .......... *H04L 1/0625* (2013.01); *H04L 1/0631* (2013.01); *H04N 19/37* (2014.11); *H04N 19/66* (2014.11)

(58) Field of Classification Search
CPC ......... H04W 72/0446; H04W 72/0453; H04W 72/04; H04W 24/02; H04N 19/37; H04N 19/66
See application file for complete search history.

(56) References Cited

U.S. PATENT DOCUMENTS

| | | | | |
|---|---|---|---|---|
| 2009/0003480 A1* | 1/2009 | Chen | ........................ | H01Q 3/30 375/260 |
| 2009/0042511 A1* | 2/2009 | Malladi | ................... | H04L 5/023 455/62 |
| 2012/0114064 A1* | 5/2012 | Kotecha | ............... | H04B 7/0417 375/295 |
| 2012/0307934 A1* | 12/2012 | Heidari | ................ | H04L 1/0003 375/295 |

* cited by examiner

TRANSMISSION, RECEPTION AND SYSTEM USING MULTIPLE ANTENNAS

CROSS-REFERENCE TO RELATED APPLICATIONS

The present application is based on, and claims priority from, Korean Patent Application Number 10-2013-0048928, filed Apr. 30, 2013 and Korean Patent Application Number 10-2013-0048929, filed Apr. 30, 2013. The disclosures of above-listed applications are hereby incorporated by reference in their entireties for all purposes.

TECHNICAL FIELD

The present disclosure in some embodiments relates to transmission, reception and an apparatus using multiple antennas. More particularly, the present disclosure relates to a transmission, reception and an apparatus which are applicable to the environment where different receivers coexist with diverse reception capabilities.

BACKGROUND

The statements in this section merely provide background information related to the present disclosure and may not constitute prior art.

Recently, a multiple-input multiple-output (MIMO) system is attracting considerable attention and has been widely researched. Since the MIMO system provides capacity and diversity significantly greater than those of a single antenna system, the MIMO system is employed in many wireless communication standards and commercially available products therefore have already been released. Diverse multiple antenna transmission schemes have been researched and may be largely divided into two schemes: a spatial multiplexing scheme and a transmit diversity scheme.

In the spatial multiplexing scheme, independent signals are transmitted via transmission antennas to increase system capacity without additional bandwidth expansion. A representative example of the spatial multiplexing scheme includes V-BLAST. The transmit diversity scheme provides diversity and coding gain. A representative example of the transmit diversity scheme includes orthogonal space-time block code (OSTBC) such as Alamouti code.

Transmitters and receivers having multiple antennas and supporting excellent and diverse multiple antenna transmission schemes have appeared.

Accordingly, there is a need for efficient multiple antenna transmission/reception technologies, considering an environment where receivers having diverse reception capabilities (e.g., the number of reception antennas, decodable multiple antenna transmission scheme, etc.) exist.

SUMMARY

In accordance with some embodiments of the present disclosure, a transmission apparatus includes first to M-th transmission antennas, where M is a natural number≥2, first to L-th encoders, where L is a natural number≥2, and first to M-th transmission signal generators. The l-th encoder (where l=arbitrary natural number between 1 and L) receives an l-th symbol sequence generates first to M-th encoded symbol sequences by encoding the received l-th symbol sequence according to a l-th multiple antenna transmission scheme. The m-th transmission signal generator (where m=arbitrary natural number between 1 and M) combines m-th encoded symbol sequences generated by the encoders to generate a signal to be transmitted via the m-th transmission antenna.

In accordance with some embodiments of the present disclosure, a transmission apparatus includes a transmit diversifying encoder configured to generate first and second transmit diversity symbol sequences by encoding a first symbol sequence according to a transmit diversity-based multiple antenna transmission scheme, a spatial multiplexing encoder configured to generate first and second spatial multiplexing symbol sequences by encoding a second symbol sequence according to a spatial multiplexing-based multiple antenna transmission scheme, a first transmission signal generator configured to generate a signal to be transmitted via a first transmission antenna by combining the first transmit diversity symbol sequence and the first spatial multiplexing symbol sequence, and a second transmission signal generator configured to generate a signal to be transmitted via a second transmission antenna by combining the second transmit diversity symbol sequence and the second spatial multiplexing symbol sequence.

In accordance with some embodiments of the present disclosure, a transmission method includes generating first and second transmit diversity symbol sequences by encoding a first symbol sequence according to a transmit diversity-based multiple antenna transmission scheme, generating first and second spatial multiplexing symbol sequences by encoding a second symbol sequence according to a spatial multiplexing-based multiple antenna transmission scheme, combining the first transmit diversity symbol sequence and the first spatial multiplexing symbol sequence to thereby generate a signal to be transmitted via a first transmission antenna, and combining the second transmit diversity symbol sequence and the second spatial multiplexing symbol sequence to thereby generate a signal to be transmitted via a second transmission antenna.

In accordance with some embodiments of the present disclosure, a receiver includes a reception unit configured to receive a wireless signal via N (natural number) reception antennas and to output the N received signals, and a symbol detection unit configured to detect at least one symbol sequence based on the N received signals. The wireless signal received by the reception unit includes a signal transmitted from first to M-th transmission antennas, where M≥natural number of 2. The signal transmitted from the m-th transmission antenna (where m=arbitrary natural number between 1 and M) includes a signal generated from combining a m-th encoded symbol sequences generated according to first to L-th (L is a natural number≥2) multiple antenna transmission schemes, wherein the l-th (l=arbitrary natural number between 1 and L) multiple antenna transmission scheme encodes a l-th symbol sequence to thereby generate first to M-th encoded symbol sequences.

In accordance with some embodiments of the present disclosure, a receiver includes a reception unit configured to receive a wireless signal via N (natural number of 1 or more) reception antennas and to generate N received signals, and a symbol detection unit configured to detect a symbol sequence based on the N received signals. The wireless signal received by the reception unit includes signals transmitted from first and second transmission antennas. The signal transmitted from the first transmission antenna includes a signal obtained by combining a first transmit diversity symbol sequence and a first spatial multiplexing symbol sequence and the signal transmitted from the second transmission antenna includes a signal obtained by combining a second transmit diversity symbol sequence and a second spatial multiplexing symbol sequence. The first and second transmit diversity symbol sequences are obtained by encoding a first symbol sequence according to a transmit diversity-based multiple antenna transmission scheme. The first and second spatial multiplexing symbol sequences are obtained by encoding a second symbol sequence according to a spatial multiplexing-based multiple antenna transmission scheme.

In accordance with some embodiments of the present disclosure, a reception method includes receiving a wireless signal via N (natural number of 1 or more) reception antennas to generate N received signals, and detecting a symbol sequence based on the N received signals. The wireless signal received by the reception unit includes signals transmitted from first and second transmission antennas. The signal transmitted from the first transmission antenna includes a signal obtained by combining a first transmit diversity symbol sequence and a first spatial multiplexing symbol sequence and the signal transmitted from the second transmission antenna includes a signal obtained by combining a second transmit diversity symbol sequence and a second spatial multiplexing symbol sequence. The first and second transmit diversity symbol sequences are obtained by encoding a first symbol sequence according to a transmit diversity-based multiple antenna transmission scheme. The first and second spatial multiplexing symbol sequences are obtained by encoding a second symbol sequence according to a spatial multiplexing-based multiple antenna transmission scheme.

In accordance with some embodiments of the present disclosure, an apparatus includes a transmitter including M (natural number of 2 or more) transmission antennas, a first receiver including $N_1$ (natural number) reception antennas and a second receiver including $N_2$ (natural number) reception antennas. The transmitter may include first to L-th encoders, where L is a natural number≥2, and first to M-th transmission signal generators. The l-th encoder (where l=arbitrary natural number between 1 and L) receives an l-th symbol sequence and generates first to M-th encoded symbol sequences according to an l-th multiple antenna transmission scheme. The m-th transmission signal generator (where m=arbitrary natural number between 1 and M) combines m-th encoded symbol sequences generated by the encoders to generate a signal to be transmitted via an m-th transmission antenna. The multiple antenna transmission schemes include a multiple antenna transmission scheme for disabling the first receiver from performing decoding but enabling the second to perform decoding and another multiple antenna transmission scheme for enabling the first receiver to perform decoding.

Yet another at least one embodiment of the present disclosure provides a tangible computer-readable medium containing instructions. These instructions may cause at least one processor to perform a transmission method, when executed by a transmitter including a transmit diversity encoder, a spatial multiplexing encoder and first and second transmission signal generators. This transmission method includes generating first and second transmit diversity symbol sequences by encoding a first symbol sequence using a transmit diversity encoder according to a transmit diversity-based multiple antenna transmission scheme, generating first and second spatial multiplexing symbol sequences by encoding a second symbol sequence using a spatial multiplexing encoder according to a spatial multiplexing-based multiple antenna transmission scheme, generating a signal to be transmitted via a first transmission antenna by combining the first transmit diversity symbol sequence and the first spatial multiplexing symbol sequence using a first transmission signal generator; and generating a signal to be transmitted via a second transmission antenna by combining the second transmit diversity symbol sequence and the second spatial multiplexing symbol sequence using a second transmission signal generator.

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure. Additional aspects, embodiments and features to those described above will become apparent with reference to the following detailed description and drawings.

DETAILED DESCRIPTION

Figure 1:
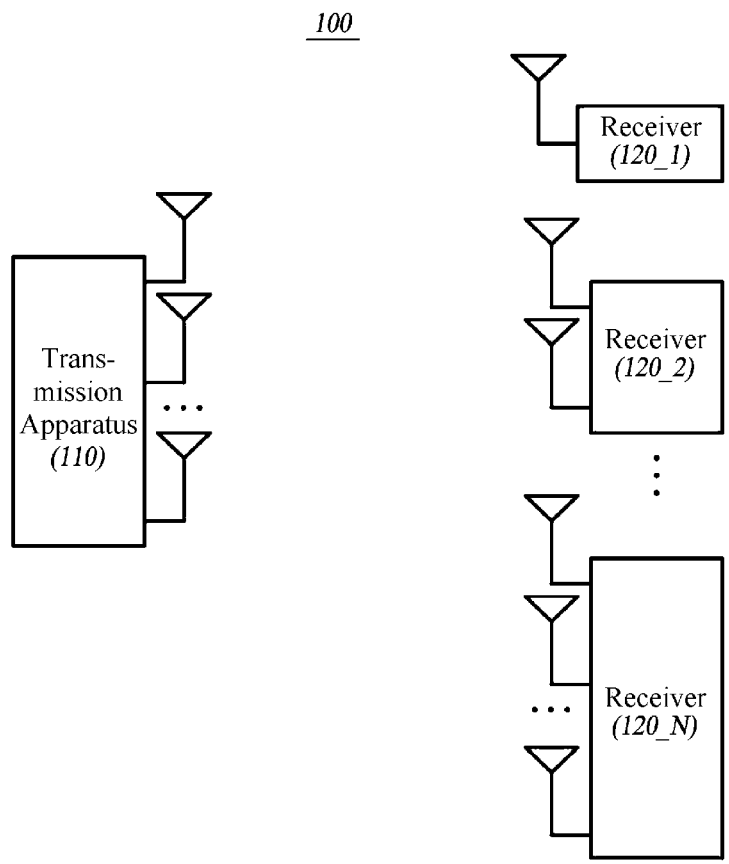
FIG. 1 is a view of an apparatus using multiple antennas according to at least one embodiment of the present disclosure.

In the following detailed description, reference is made to the accompanying drawings which form a part of this disclosure. In the following description, like reference numerals designate like elements unless they convey different meanings in the context. Exemplary embodiments as described in the detailed description, drawings and claims are not intended as limiting. The present disclosure can be extended to other embodiments and be subject to other modifications without departing from the scope and idea of the disclosed subject. The aspects of the present disclosure as generally described and illustrated in the drawings can be arranged, replaced, combined, divided and designed in a wide variety of configurations, which will be clearly understood as being taken into account explicitly.

FIG. 1 is a view of an apparatus using multiple antennas according to at least one embodiment of the present disclosure.

Referring to FIG. 1, the apparatus may include a transmitter 110 including a plurality of transmission antennas and receivers 120, 130 and 140 each including various numbers of reception antennas.

In general, as the number of transmission antennas and the number of reception antennas are increased, more efficient and diverse multiple antenna technology may be used. For example, when the number of transmission antennas is M and the number of reception antennas is N and N is equal to or greater than M, a data transfer rate (or a symbol rate) may be increased by M times using a spatial multiplexing scheme. In contrast, when the number of reception antennas is 1, the spatial multiplexing scheme may not be used and thus a data transfer rate may not be increased. In this case, high diversity is obtained using a transmit diversity scheme. The transmit diversity scheme refers to an encoding scheme which may be used regardless of the number of reception antennas.

In general, when a high data transfer rate is required, the spatial multiplexing scheme is more advantageous than the transmit diversity scheme. However, in a broadcast system, terminals having different numbers of reception antennas are mixed in a service area as described above. Accordingly, a transmitter transmits data using a multiple antenna coding scheme capable of being decoded by a terminal having a least number of reception antennas. This is because terminals having N<M may not decode the transmitted signal when the above-described spatial multiplexing scheme is used.

Examples of the apparatus 100 may include, but is not limited to, a cellular communication system, a broadcast system, an ad hoc communication system, etc. In a cellular communication system, the transmitter 110 may be included in a base station and the receivers 120, 130 and 140 may be included in a user equipment. Each of the receivers 120, 130 and 140 may be included in a broadcast reception terminal. In an ad hoc communication system, each of the transmitter and the receivers 120, 130 and 140 may be an ad hoc terminal.

The transmitter 110 may transmit data to the receivers 120, 130 and 140 in a broadcast manner or any one of the receivers 120, 130 and 140 in a unicast manner, using a multiple antenna transmission scheme.

If the transmitter 110 may confirm reception capabilities of the target receiver 120, 130 or 140 when transmitting data in a unicast manner, the transmitter may transmit data using a transmission method suitable for the reception capabilities. Reception capabilities may include a decodable multiple antenna transmission scheme, a channel state, etc. For example, if a channel state is good, the transmitter 110 may transmit data using a multiple antenna transmission scheme for providing a maximum transfer rate.

When the transmitter 110 transmits data to the receivers 110, 120 and 130 in a multicast or broadcast manner, a transmission scheme which enables the target receivers 110, 120 and 130 to decode a desired signal is used.

Figure 2:
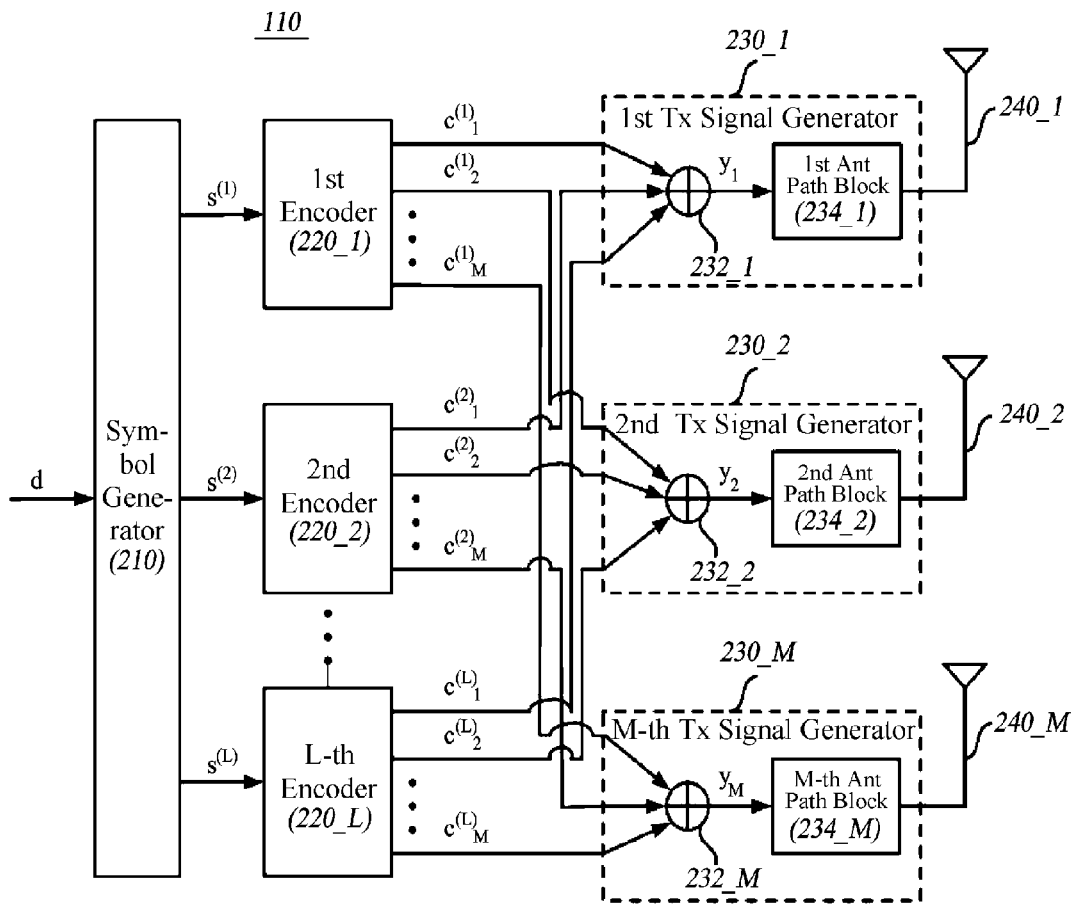
FIG. 2 is a block diagram of a transmitter according to at least one embodiment.

FIG. 2 is a block diagram of a transmitter according to at least one embodiment.

Referring to FIG. 2, the transmitter 110 may include a symbol generator 210, first to L-th (L is a natural number of 2 or more) encoders 220_1, 22-_2, . . . , 220_L and first to M-th (M is a natural number of 2 or more) transmission signal generators 230_1, 230_2, . . . , 230_M.

The symbol generator 210 may generate first to L-th symbol sequences $s^{(1)}, s^{(2)}, \ldots, s^{(L)}$ based on input data d.

The data d may include data bits having different priorities. Examples of such data may include scalable video data. Scalable video data includes base layer data and enhancement layer data. The base layer data is a class significant more than the enhancement layer data. When the base layer data is not successfully received, a video image may not be restored. If only the base layer data is successfully received, an image with low quality is restored. When the enhancement layer data is restored, quality may be improved. That is, the base layer data is supposed to be received and restored but the enhancement layer data is received and restored in order to obtain higher quality. Therefore, the base layer data is robustly protected against error as compared to the enhancement layer data.

The symbol generator 210 may generate the first to L-th symbol sequences $s^{(1)}, s^{(2)}, \ldots, s^{(L)}$ by applying an unequal error protection scheme to the input data d.

Examples of the unequal error protection scheme include, but is not limited to, a scheme for applying robust error correction coding to data having high priority (that is, data of a more significant class), a scheme for applying different coded modulations according to the significance of each class and a scheme for utilizing unequal constellation called hierarchical modulation. In the scheme for utilizing unequal constellation, data of a significant class is mapped to bits of a symbol having a larger Euclidean distance.

Figure 3:
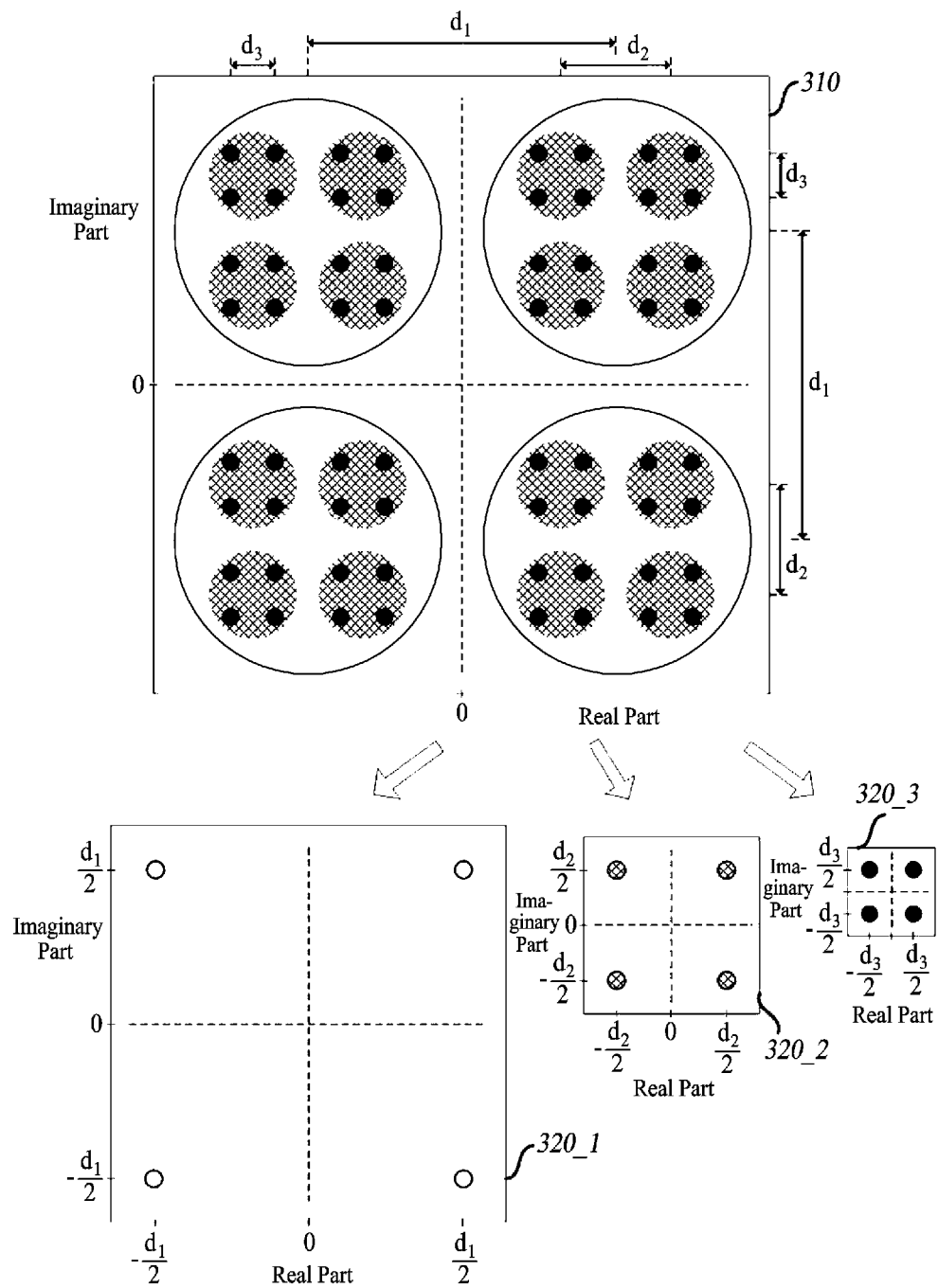
FIG. 3 is a diagram of a method for generating symbols according to at least one embodiment.

Examples of utilizing the unequal error protection scheme at the symbol generator 210 may include a scheme for generating first to L-th symbol sequences $s^{(1)}, s^{(2)}, \ldots, s^{(L)}$ by applying symbol mapping to first to L-th data bit sequences using first to L-th hierarchical sub-constellation obtained by decomposing hierarchical constellation if input data d includes first to L-th data bit sequences having first to L-th priorities and will be additionally described below with reference to FIG. 3.

An l-th (l is an arbitrary natural number between 1 and L) encoder 220_l may receive an l-th symbol sequence $s^{(l)}$) and generate first to M-th encoded symbol sequences $c^{(l)}_1, c^{(l)}_2, \ldots, c^{(l)}_M$ according to an l-th multiple antenna transmission scheme.

In one embodiment, first to L-th multiple antenna schemes include a multiple antenna transmission scheme for disabling a receiver having $N_1$ (natural number) of reception antennas from performing decoding and enabling a receiver having $N_2$ (natural number greater than $N_1$) of reception antennas to perform decoding and a multiple antenna transmission scheme for enabling a receiver having $N_1$ reception antennas to perform decoding.

In another embodiment, at least some of the first to L-th multiple antenna transmission schemes may have different symbol rates. For example, the first to L-th symbol sequences $s^{(1)}, s^{(2)}, \ldots, s^{(L)}$ have different priorities and a symbol rate of a multiple antenna transmission scheme applied to a symbol sequence having high priority (e.g., $s^{(1)}$) may be lower than that of a multiple antenna transmission scheme applied to a symbol sequence having low priority (e.g., $s^{(L)}$).

In another embodiment, at least some of the first to L-th multiple antenna transmission schemes may have different diversity gains. For example, the first to L-th symbol sequences $s^{(1)}, s^{(2)}, \ldots, s^{(L)}$ have different priorities and diversity gain of a multiple antenna transmission scheme applied to a symbol sequence having high priority (e.g., $s^{(1)}$) may be higher than that of a multiple antenna transmission scheme applied to a symbol sequence having lower priority (e.g., $s^{(L)}$).

The m-th (m is an arbitrary natural number between 1 and M) transmission signal generator 230_m may combine m-th encoded symbol sequences $c^{(1)}_m, c^{(2)}_m, \ldots, c^{(L)}_m$ generated by encoders 220_1, 220_2, . . . , 220_L to generate a signal to be transmitted via the m-th transmission antenna 240_m.

The m-th transmission signal generator 230_m may include a m-th adder 232_m and a m-th antenna path block 234_m. The m-th adder 232_m adds m-th symbol sequences $c^{(1)}_m, c^{(2)}_m, \ldots, c^{(L)}_m$ generated by the first to M-th encoders and the m-th antenna path block 234_m may generate a signal to be transmitted via the m-th transmission antenna based on the added signal $y_m$ provided from the m-th adder 232_m.

The signal $y_m$ output from the m-th adder 232_m may be expressed by Equation 1.

$$y_m(k) = \sum_{l=1}^{L} c_m^{(l)}(k) \qquad \text{Equation 1}$$

In Equation 1, k denotes a symbol index having a value of 1, 2, 3, or the like.

The m-th antenna path block 234_m may include a modulation circuit and/or a radio frequency circuit. The modulation circuit modulates an input signal using a modulation method predetermined by the apparatus 100. For example, the modulation circuit may generate an orthogonal frequency division multiplexing symbol based on the added signal. The radio frequency circuit may convert an input signal (the output signal of the modulation circuit or the added signal) into a signal having a radio frequency predetermined by the apparatus 100.

Figure 4:
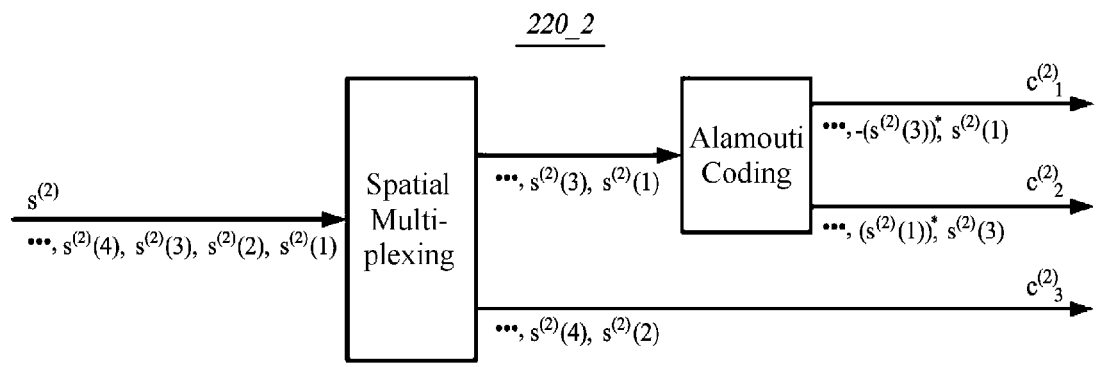
FIG. 4 is a diagram of a multiple antenna transmission scheme according to at least one embodiment.

To facilitate understanding, first, an embodiment of the transmitter 110 when L=3 and M=3 will be described with reference to FIGS. 2 to 4.

The symbol generator 210 may generate first to third symbol sequences $s^{(1)}$, $s^{(2)}$, $s^{(3)}$ based on input data. For example, the symbol generator 210 may generate a first symbol sequence $s^{(1)}$, a second symbol sequence $s^{(2)}$ and a third symbol sequence ($s^{(3)}$ using first hierarchical sub-constellation, second hierarchical sub-constellation and third hierarchical sub-constellation.

FIG. 3 is a diagram of a method for generating symbols according to at least one embodiment.

The hierarchical constellation 310 shown in FIG. 3 may be used for hierarchical modulation using 64 quadrature amplitude modulation (QAM). 64 symbols (black circles of FIG. 3) located on the hierarchical constellation 310 correspond to complex values of $$\left(\pm \frac{d_1}{2} \pm \frac{d_2}{2} \pm \frac{d_3}{2}\right) + j\left(\pm \frac{d_1}{2} \pm \frac{d_2}{2} \pm \frac{d_3}{2}\right),$$

respectively.

The symbol generator 210 may generate a first symbol sequence $s^{(1)}$, a second symbol sequence $s^{(2)}$ and a third symbol sequence $s^{(3)}$ using first hierarchical sub-constellation 320_1, second hierarchical sub-constellation 320_2 and third hierarchical sub-constellation 320_3 obtained by decomposing the hierarchical constellation 310. Each symbol of the first symbol sequence $s^{(1)}$ in 2-bit value has $$\pm \frac{d_1}{2} + j\left(\pm \frac{d_1}{2}\right),$$

each symbol of the second symbol sequence $s^{(2)}$ in 2-bit value has $$\pm \frac{d_2}{2} + j\left(\pm \frac{d_2}{2}\right),$$

and each symbol of the third symbol sequence $s^{(3)}$ in 2-bit value has $$\pm \frac{d_3}{2} + j\left(\pm \frac{d_3}{2}\right).$$

When input data includes a first bit sequence having first priority, a second bit sequence having second priority and a third bit sequence having third priority, the symbol generator 120 may generate a first symbol using first hierarchical sub-constellation 320_1 for every 2-bit input of the first bit sequence, generate a second symbol using second hierarchical sub-constellation 320_2 for every 2-bit input of the second bit sequence and generate a third symbol using third hierarchical sub-constellation 320_3 for every 2-bit input of the third bit sequence.

The first encoder 220_1, the second encoder 220_2 and the third encoder 220_3 may use a multiple antenna transmission scheme for enabling a receiver having one reception antenna to perform decoding, a multiple antenna transmission scheme for enabling a receiver having two or more reception antennas to perform decoding and a multiple antenna transmission scheme for enabling a receiver having three or more reception antennas to perform decoding.

Examples of the encoding scheme for enabling the receiver having one reception antenna to perform decoding may include a repeated transmission scheme, an orthogonal space-time block code or a quasi-orthogonal space-time block code (QOSTB). Examples of the encoding scheme for enabling the receiver having two reception antennas to perform decoding may include a combination of a Alamouti coding scheme shown in FIG. 4 and a spatial multiplexing scheme and examples of the encoding scheme for enabling the receiver having three reception antennas to perform decoding may include a spatial multiplexing scheme.

For helping understanding, one embodiment of the transmitter 110 when L=2 and M=2 will be described with reference to FIGS. 5 and 6.

Figure 5:
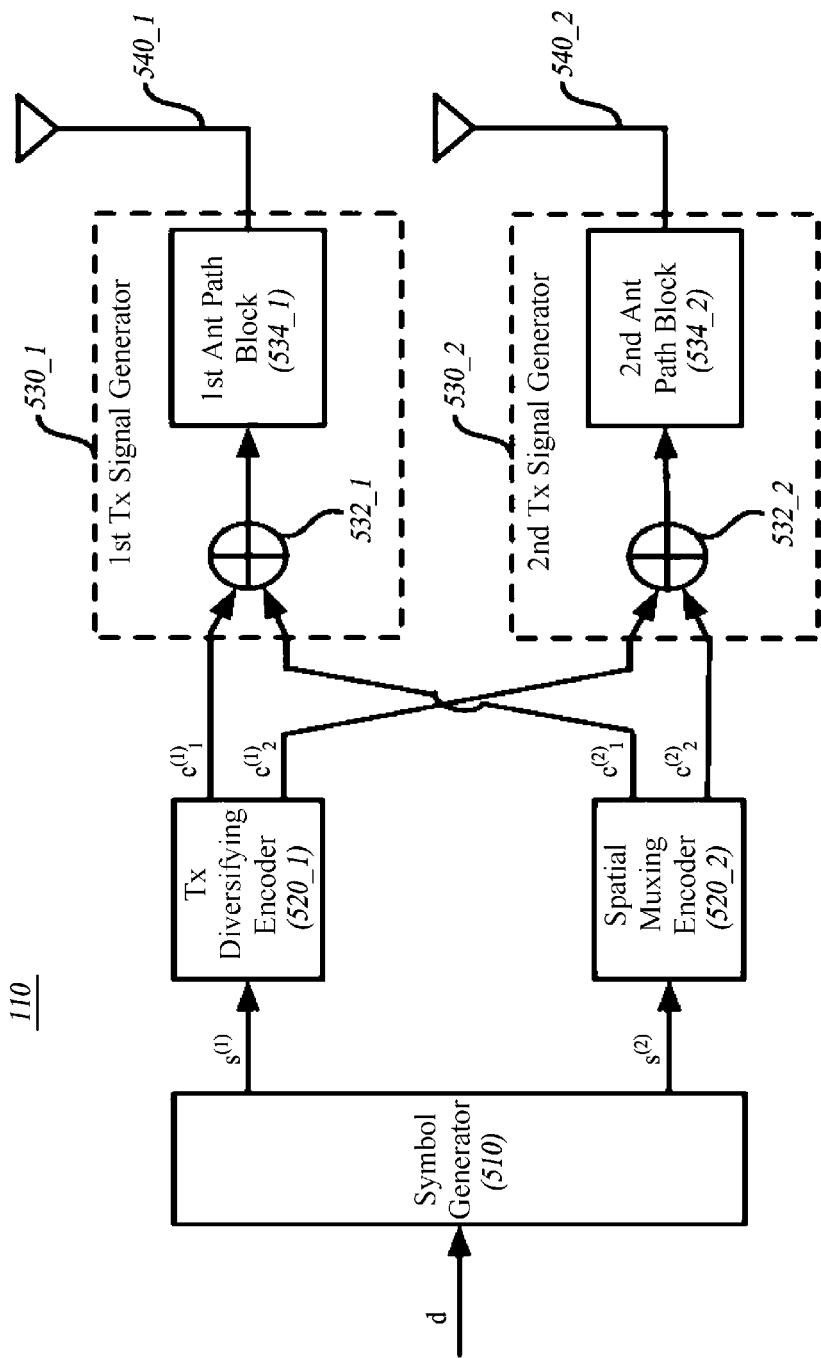
FIG. 5 is a block diagram of a transmission apparatus according to another embodiment.

FIG. 5 is a block diagram of a transmission apparatus according to another embodiment.

Referring to FIG. 5, the transmitter 110 may include a symbol generator 510, a transmit diversifying encoder 520_1, a spatial multiplexing encoder 5220_2, a first transmission signal generator 530_1, a second transmission signal generator 530_2, a first transmission antenna 540_1 and a second transmission antenna 540_2.

The symbol generator 510 may generate first and second symbol sequences $s^{(1)}$ and $s^{(2)}$ based on input data d. For example, when input data includes a first bit sequence having first priority and a second bit sequence having second priority, the symbol generator 210 may generate a first symbol using higher layer sub-constellation for every 2-bit input of the first bit sequence and generate a second symbol using lower layer sub-constellation for every 2-bit input of the second bit sequence.

Figure 6:
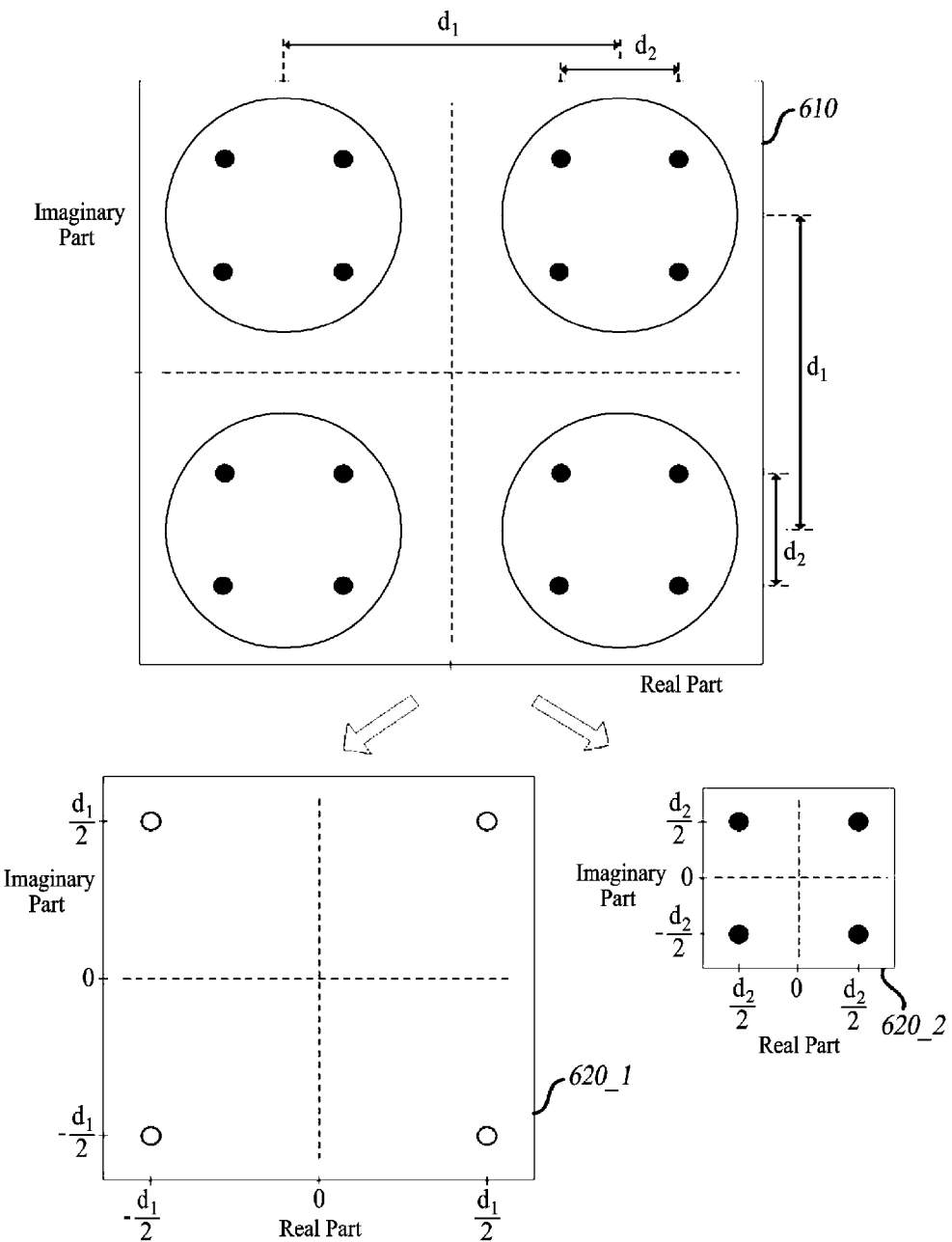
FIG. 6 is a diagram of a method for generating symbols according to another embodiment.

The hierarchical constellation 610 shown in FIG. 6 may be used for hierarchical modulation using 16 quadrature amplitude modulation (QAM). 16 symbols (black circles of FIG. 6) located on the hierarchical constellation 610 correspond to complex values of $$\left(\pm \frac{d_1}{2} \pm \frac{d_2}{2}\right) + j\left(\pm \frac{d_1}{2} \pm \frac{d_2}{2}\right),$$

respectively.

The symbol generator 510 may generate a first symbol sequence $s^{(1)}$ and a second symbol sequence $s^{(2)}$ using first hierarchical sub-constellation 620_1 and second hierarchical sub-constellation 620_2 obtained by decomposing the hierarchical constellation 610. Each symbol of the first symbol sequence $s^{(1)}$ in 2-bit value has $$\pm \frac{d_1}{2} + j\left(\pm \frac{d_1}{2}\right)$$

and each symbol of the second symbol sequence $s^{(2)}$ in 2-bit value has $$\pm \frac{d_2}{2} + j\left(\pm \frac{d_2}{2}\right).$$

The transmit diversifying encoder 520_1 encodes the first symbol sequence $s^{(1)}$ according to a transmit diversity-based multiple antenna transmission scheme and generates first and second transmit diversity symbol sequences $c^{(1)}_1$, $c^{(1)}_2$. For example, the transmit diversifying encoder 520_1 may apply Alamouti coding to the first symbol sequence $s^{(1)}$ and generate the first and second transmit diversity symbol sequences $c^{(1)}_1$, $c^{(1)}_2$.

The spatial multiplexing encoder 520_2 may encode the second symbol sequence $s^{(2)}$ according to a spatial multiplexing-based multiple antenna transmission scheme and generate first and second spatial multiplexing symbol sequences $c^{(2)}_1$, $c^{(2)}_2$.

The first transmission signal generator 530_1 may combine the first transmit diversity symbol sequence $c^{(1)}_1$ and the first spatial multiplexing symbol sequence $c^{(2)}_1$ and generate a signal to be transmitted via the first transmission antenna 540_1.

The second transmission signal generator 530_2 may combine the second transmit diversity symbol sequence $c^{(1)}_2$ and the second spatial multiplexing symbol sequence $c^{(2)}_2$ and generate a signal to be transmitted via the second transmission antenna 540_2.

Figure 7:
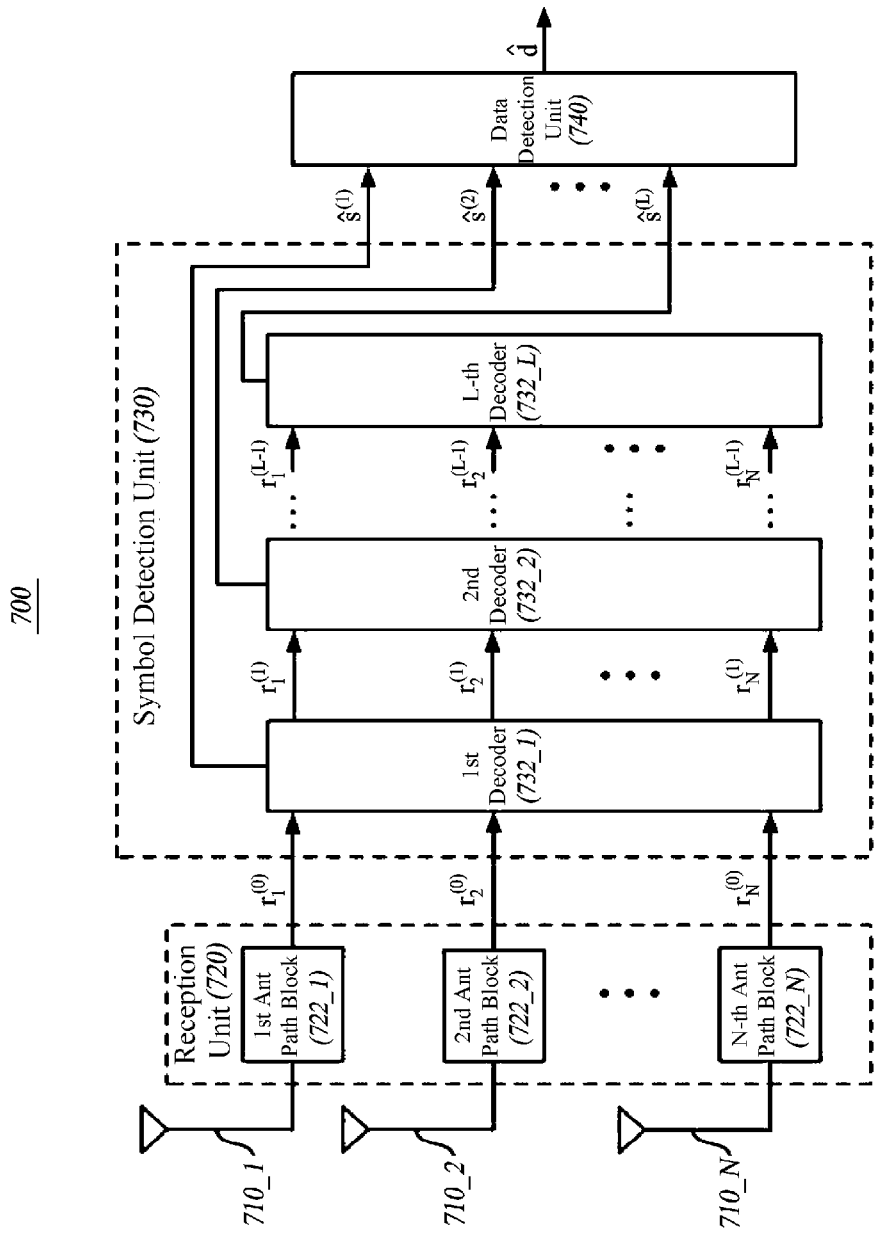
FIG. 7 is a block diagram of a receiver according to at least one embodiment.

FIG. 7 is a block diagram of a receiver according to at least one embodiment.

Referring to FIG. 7, the receiver 120 may include first to N-th reception antennas 710_1, 710_2, ..., 710_N, a reception unit 720, a symbol detection unit 730, a data detection unit 740. For example, N=1 in the first receiver 110 of FIGS. 1 and N=2 in the second receiver 120.

The reception unit 720 may receive wireless signals via reception antennas 710_1, 710_2, ..., 710_N and output N received signals $r_1^{(0)}, r_2^{(0)}, \ldots, r_N^{(0)}$. The reception unit 720 may include circuits corresponding to the above-described antenna path blocks 234_1, 234_2, ..., 234_M.

A k-th symbol of a n-th (n is an arbitrary natural number between 1 and N) reception signal $r_n^{(0)}$ may be expressed by Equation 2.

$$r_n^{(0)}(k) = \Sigma_{m=1}^M h_{mn}(k) \cdot y_m(k) + w_n(k) = \Sigma_{m=1}^M \Sigma_{l=1}^L h_{mn}(k) \cdot c_m^{(l)}(k) + w_n(k) \qquad \text{Equation 2}$$

where, $h_{mn}(k)$ denotes a channel value (or channel gain) between an m-th transmission antenna of the transmitter 110 and a n-th reception antenna of the receiver 120 and $w_n(k)$ denotes noise (e.g., Additive white Gaussian noise (AWGN)).

The symbol detection unit 730 may detect at least one symbol sequence (e.g., a first symbol sequence) based on the reception signals $r_1^{(0)}, r_2^{(0)}, \ldots, r_N^{(0)}$.

The symbol detection unit 730 may include first to L-th decoders 732_1, 732_2, ..., 732_L as shown in FIG. 7.

The first decoder 732_1 may decode the N received signals $r_1^{(0)}, r_2^{(0)}, \ldots, r_N^{(0)}$ according to a decoding scheme corresponding to a first multiple antenna transmission scheme and detect a first symbol sequence $\hat{s}^{(1)}$.

An l-th (l is an arbitrary natural number between 2 and L) decoder 732_l may decode signals $r_1^{(l-1)}, r_2^{(l-1)}, \ldots, r_N^{(l-1)}$ obtained by removing signal components of the detected first to (l−1)-th symbol sequences from the N received signals $r_1^{(0)}, r_2^{(0)}, \ldots, r_N^{(0)}$ according to a decoding scheme corresponding to the L-th multiple antenna transmission scheme and detect a l-th symbol sequence $\hat{s}^{(l)}$.

For example, as shown in FIG. 7, the l-th (l is an arbitrary natural number between 2 and L) decoder 732_l may receive signals $r_1^{(l-1)}, r_2^{(l-1)}, \ldots, r_N^{(l-1)}$ output from the (l−1)-th decoder 732_l−1, detect the l-th symbol sequence $\hat{s}^{(l)}$, remove the components of the l-th symbol sequence $\hat{s}^{(l)}$ detected from the signals $r_1^{(l-1)}, r_2^{(l-1)}, \ldots, r_N^{(l-1)}$ output from the (l−1)-th decoder 732_l−1, and output the signal obtained by removing the components to a (l+1)-th decoder 732_l+1) The above-described process may be expressed by Equation 3.

$$r_n^{(l)}(k) = r_n^{(l-1)}(k) - \Sigma_{m=1}^M \hat{h}_{mn}(k) \cdot \hat{c}_m^{(l)}(k) \qquad \text{Equation 3}$$

In Equation 3, k denotes a symbol index having a value of 1, 2, 3, or the like. $\Sigma_{m=1}^M \hat{h}_{mn}(k) \cdot \hat{c}_m^{(l)}(k)$ denotes an estimate of the component of the l-th symbol sequence $s^{(l)}$ included in the reception signal. $\hat{h}_{mn}(k)$ is an estimate of $h_{mn}(k)$ and may be obtained via channel estimation. $\hat{c}_m^{(l)}(k)$ is an estimate of $c_m^{(l)}(k)$ and may be obtained from the detected l-th symbol sequence $\hat{s}^{(l)}$.

If the transmitter 110 of FIG. 5 uses the Alamouti coding scheme as the transmit diversity-based multiple antenna transmission scheme, a first receiver (e.g., 120_1 of FIG. 1) having one reception antenna and a second or third receiver (e.g., 120_2 or 120_3 of FIG. 1) having two or more reception antennas operate as follows.

A first symbol and a second symbol included in wireless signals received via an n-th antenna may be expressed by Equations 4 and 5.

$$r_n^{(0)}(1) = h_{1n}(1) \cdot y_1(1) + h_{2n}(1) \cdot y_2(1) + w_n(1) \qquad \text{Equation 4}$$
$$= h_{1n}(1) \cdot (s^{(1)}(1) + s^{(2)}(1)) + h_{2n}(1) \cdot (s^{(1)}(2) + s^{(2)}(2)) + w_n(1)$$

$$r_n^{(0)}(2) = h_{1n}(2) \cdot y_1(2) + h_{2n}(2) \cdot y_2(2) + w_n(2) \qquad \text{Equation 5}$$
$$= h_{1n}(2) \cdot (-(s^{(1)}(2))^* + s^{(2)}(3)) + h_{2n}(2) \cdot ((s^{(1)}(1))^* + s^{(2)}(4)) + w_n(2)$$

The first receiver (e.g., 120_1 of FIG. 1) having one reception antenna has one reception antenna and thus may detect only the first symbol sequence. For example, the first receiver 120_1 may not include the second to L-th decoders 732_2, ..., 732_L in FIG. 7. Although examples of the method of detecting the first symbol sequence $\hat{s}^{(1)}(1)$, $\hat{s}^{(1)}(2)$, ... at the first decoder 732_1 of the first receiver 120_1 include methods of using Equations 6 and 7, the present invention is not limited thereto.

$$\hat{s}^{(1)}(1) = (\hat{h}_{11})^* \cdot r_1^{(0)}(1) + \hat{h}_{21} \cdot (r_1^{(0)}(2))^* \qquad \text{Equation 6}$$

$$\hat{s}^{(1)}(2) = (\hat{h}_{21})^* \cdot r_1^{(0)}(1) - \hat{h}_{21} \cdot (r_1^{(0)}(2))^* \qquad \text{Equation 7}$$

In Equations 6 and 7, $\hat{h}_{11}$ denotes an estimate of $h_{11}(1)$ and $h_{11}(2)$ on the assumption that $h_{11}(1)$ and $h_{11}(2)$ are similar and $\hat{h}_{21}$ denotes an estimate of $h_{21}(1)$ and $h_{21}(2)$ on the assumption that $h_{21}(1)$ and $h_{21}(2)$ are similar.

The receiver including two or more antennas detects a first symbol sequence using the above-described scheme or a scheme for utilizing all signals received via all reception antennas, removes components corresponding to the first symbol sequence from the reception signals, and obtains a second symbol sequence. For example, the second and third receivers 120_2 and 120_3 of FIG. 1 may include the first decoder 732_1 and the second decoder 732_2 of FIG. 7 and detect the first and second symbol sequences.

The first reception symbol when the component of the first symbol sequence is completely removed from the reception signal is expressed by Equation 8.

$$r_n^{(1)}(1) = h_{1n}(1) \cdot s^{(2)}(1) + h_{2n}(1) \cdot s^{(2)}(2) + w_n(1) \quad \text{Equation 8}$$

where, n denotes a natural number belonging to 1 to N.

If N is equal to or greater than 2, the second symbol sequence $s^{(2)}(1)$, $s^{(2)}(2)$, . . . may be detected using diverse decoding schemes.

Figure 8:
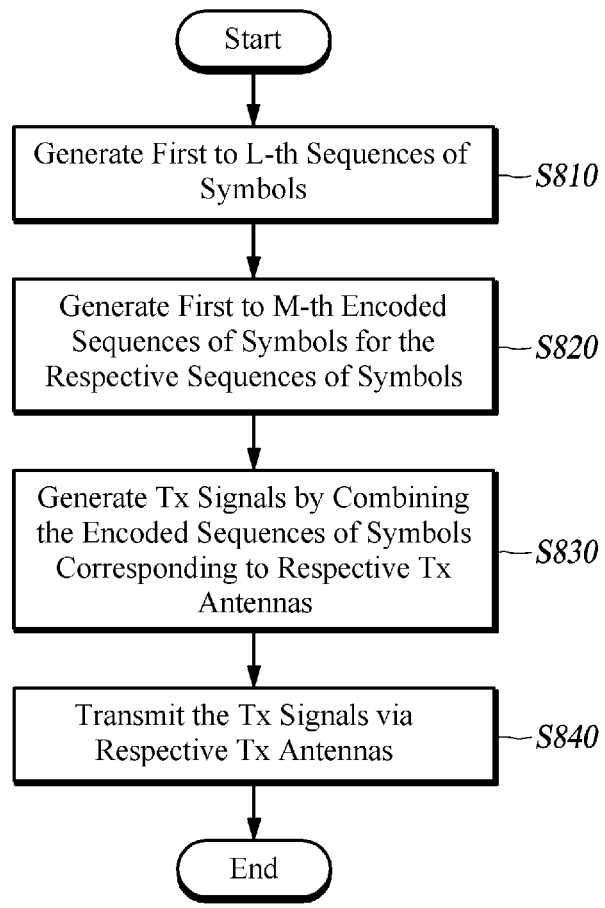
FIG. 8 is a flowchart of a transmission method according to at least one embodiment.

FIG. 8 is a flowchart of a transmission method according to at least one embodiment.

The transmission method of this disclosure may be performed via a variety of software, hardware and a combination thereof. For convenience, the transmission method performed using the transmitter 110 of FIG. 2 will be described with reference to FIGS. 2 and 8. Detailed operations of the above-described transmitter 110 are applicable to the transmission method of this disclosure and thus a repeated description thereof will be described.

The symbol generator 210 generates first to L-th symbol sequences $s^{(1)}, s^{(2)}, \ldots, s^{(L)}$ based on input data (S810). The symbol generator 210 may generate the first to L-th symbol sequences $s^{(1)}, s^{(2)}, \ldots, s^{(L)}$ by applying an unequal error protection scheme as described above.

The l-th (l is an arbitrary natural number between 1 and L) encoder 220_l may encode the l-th symbol sequence $s^{(l)}$ according to the l-th multiple antenna transmission scheme and generate the first to M-th encoded symbol sequences $c^{(l)}_1, c^{(l)}_2, \ldots, c^{(l)}_M$ (S820).

The m-th (m is an arbitrary natural number between 1 and M) transmission signal generator 230_m combines the received m-th encoded symbol sequences $c^{(1)}_m, c^{(2)}_m, \ldots, c^{(L)}_m$ and generates a signal to be transmitted via the m-th transmission antenna 240_1 based on the combined result (S830).

The generated signal is transmitted via the transmission antennas 240_1, 240_2, . . . , 240_M (S840).

Figure 9:
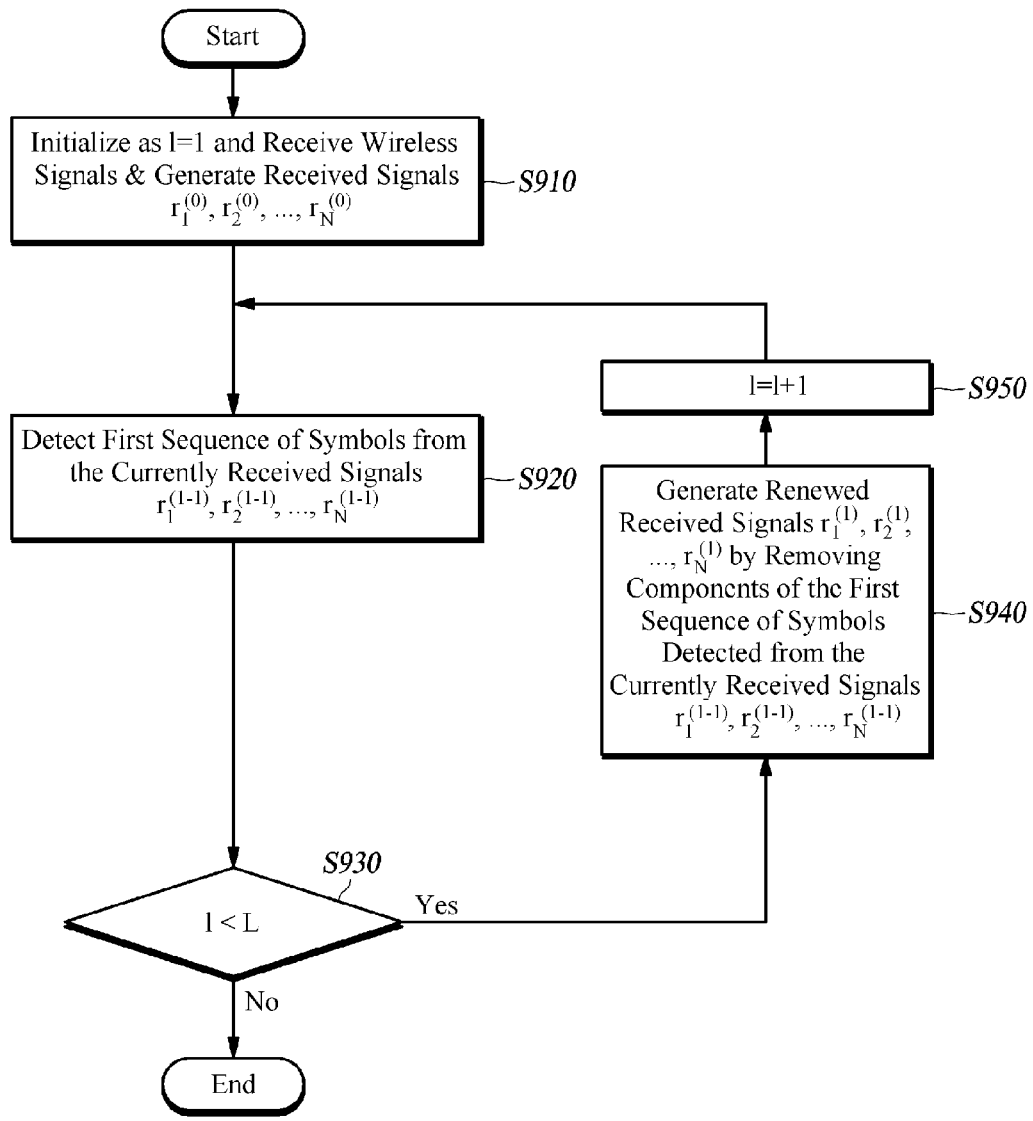
FIG. 9 is a flowchart of a reception method according to at least one embodiment.

FIG. 9 is a flowchart of a reception method according to at least one embodiment.

The transmission method of this disclosure may be performed via a variety of software, hardware and a combination thereof. For convenience, the transmission method performed using the transmitter 120 of FIG. 7 will be described with reference to FIGS. 7 and 9. Detailed operations of the above-described transmitter 120 are applicable to the transmission method of this disclosure and thus a repeated description thereof will be described.

The reception unit 720 receives wireless signals via N (N is a natural number of 1 or more) reception antennas 710_1, 710_2, . . . , 710_N, generates N received signals $r_1^{(0)}, r_2^{(0)}, \ldots, r_N^{(0)}$, and initializes l as l=1 (S910).

The symbol detector 430 detects a first symbol sequence using l-th decoder 432_l based on current reception signals $r_1^{(l-1)}, r_2^{(l-1)}, \ldots, r_N^{(l-1)}$ (S920).

If l<L is not satisfied (S930), the method ends and, otherwise, the symbol detector 430 generates renewed reception signals $r_1^{(l)}, r_2^{(l)}, \ldots, r_N^{(l)}$ by removing components of the first symbol sequence detected from the current reception signals $r_1^{(l-1)}, r_2^{(l-1)}, \ldots, r_N^{(l-1)}$ using the l-th decoder 432_l (S940). Then, the value l is renewed via l=l+1 (S950) and then the method returns to S920.

Some embodiments of this disclosure may have effects, including the following advantages. All embodiments are intended to include these advantages and thus the scope of this disclosure is not limited thereto.

In some embodiments, efficient multiple antenna transmission/reception can be performed in an environment where receivers having diverse reception capabilities (e.g., the number of reception antennas, decodable multiple antenna transmission scheme, etc.) exist.

In some embodiments, efficient broadcast data transmission can be performed.

Those skilled in the art would understand that functions of the process and method disclosed herein and other processes and methods may be implemented in different orders. In addition, steps and operations described herein are merely exemplary and some steps and operations are optional without departing from the scope of the disclosed embodiments and less and more steps and operations may be performed and additional steps and operations may be added.

In exemplary embodiments, any one of operations, processes, etc. of this disclosure may be implemented by a computer-readable command stored in a computer-readable medium. The computer-readable command may be executed by a processor of a mobile device, a network component and/or other computing device.

Although the presented method and apparatus of the exemplary embodiments of the present disclosure have been described, they are merely illustrative for the sake of brevity and clarity. Those skilled in the art will appreciate that various modifications and other equivalent embodiments are possible, without departing from the various characteristics of the disclosure. Accordingly, one of ordinary skill would understand the scope of the disclosure is not limited by the explicitly described above embodiments but by the claims and equivalents thereof.

What is claimed is:

1. A transmission apparatus, comprising:
   first to M-th transmission antennas, where M is a natural number≥2;
   first to L-th encoders, where L is a natural number≥2; and
   first to M-th transmission signal generators,
   wherein the l-th encoder, l being an arbitrary natural number between 1 and L, receives an l-th symbol sequence and generates first to M-th encoded symbol sequences by encoding the received l-th symbol sequence according to an l-th multiple antenna transmission scheme of multiple antenna transmission schemes,
   wherein the multiple antenna transmission schemes include a scheme for enabling a first receiver having a first reception antenna to perform decoding, and a scheme for enabling a second receiver having a plurality of second reception antennas to perform decoding, and
   wherein the m-th transmission signal generator, m being an arbitrary natural number between 1 and M, combines m-th encoded symbol sequences generated by the encoders to generate a signal to be transmitted via the m-th transmission antenna.

2. The transmission apparatus of claim 1, wherein first to L-th symbol sequences have different priorities.

3. The transmission apparatus of claim 2, further comprising a symbol generator configured to generate the first to L-th symbol sequences by applying an unequal error protection scheme to input data including data bits which have different priorities.

4. The transmission apparatus of claim 1, wherein the scheme for enabling the second receiver having the plurality of second reception antennas to perform decoding includes
a scheme for enabling another first receiver having a plurality of the first reception antennas to perform decoding, and
a scheme for disabling the another first receiver from performing decoding but enabling the second receiver having the plurality of second reception antennas to perform decoding.

5. The transmission apparatus of claim 1, wherein at least some of the multiple antenna transmission schemes have different symbol rates.

6. The transmission apparatus of claim 5, wherein:
first to L-th symbol sequences have different priorities, and
a symbol rate of a multiple antenna transmission scheme applied to a symbol sequence having a high priority is lower than that of a multiple antenna transmission scheme applied to a symbol sequence having a low priority.

7. The transmission apparatus of claim 1, wherein at least some of the multiple antenna transmission schemes have different diversity gains.

8. The transmission apparatus of claim 7, wherein:
first to L-th symbol sequences have different priorities, and
a diversity gain of a multiple antenna transmission scheme applied to a symbol sequence having a high priority is higher than a diversity gain of a multiple antenna transmission scheme applied to a symbol sequence having a low priority.

9. The transmission apparatus of claim 1, wherein the m-th transmission signal generator comprises an adder configured to add the m-th symbol sequences generated by the encoders.

10. The transmission apparatus of claim 1, wherein each of the transmission signal generators comprises a radio frequency circuit.

11. The transmission apparatus of claim 1, wherein each of the transmission signal generators comprises an orthogonal frequency division multiplying symbol generator configured to generate an orthogonal frequency division multiplexing symbol based on a result of combining by said each transmission signal generator.

12. A transmission apparatus, comprising:
a transmit diversifying encoder configured to generate first and second transmit diversity symbol sequences by encoding a first symbol sequence according to a transmit diversity-based multiple antenna transmission scheme;
a spatial multiplexing encoder configured to generate first and second spatial multiplexing symbol sequences by encoding a second symbol sequence according to a spatial multiplexing-based multiple antenna transmission scheme;
a first transmission signal generator configured to generate a signal to be transmitted via a first transmission antenna by combining the first transmit diversity symbol sequence and the first spatial multiplexing symbol sequence; and
a second transmission signal generator configured to generate at least one signal to be transmitted via a second transmission antenna by combining the second transmit diversity symbol sequence and the second spatial multiplexing symbol sequence.

13. The transmission apparatus of claim 12, further comprising a symbol generator configured to generate the first and second symbol sequences by applying an unequal error protection scheme to input data including data bits which have different priorities,
wherein priority of data bits corresponding to the first symbol sequence is higher than the priority of data bits corresponding to the second symbol sequence.

14. The transmission apparatus of claim 13, wherein:
each symbol of the first symbol sequence has any one of values of higher hierarchical sub-constellation and each symbol of the second sequence of symbols has any one of values of lower hierarchical sub-constellation, and
the higher hierarchical sub-constellation and the lower hierarchical sub-constellation are obtained by decomposing hierarchical constellation.

15. The transmission apparatus of claim 13, wherein an average of symbol values of the first symbol sequence is greater than that of symbol values of the second symbol sequence.

16. The transmission apparatus of claim 13, wherein the first symbol sequence corresponds to base layer data of video and the second symbol sequence corresponds to enhancement layer data of the video.

17. A transmission method, comprising:
generating first and second transmit diversity symbol sequences by encoding a first symbol sequence according to a transmit diversity-based multiple antenna transmission scheme;
generating first and second spatial multiplexing symbol sequences by encoding a second symbol sequence according to a spatial multiplexing-based multiple antenna transmission scheme;
combining the first transmit diversity symbol sequence and the first spatial multiplexing symbol sequence to thereby generate a signal to be transmitted via a first transmission antenna; and
combining the second transmit diversity symbol sequence and the second spatial multiplexing symbol sequence to thereby generate a signal to be transmitted via a second transmission antenna.

18. The transmission method of claim 17, further comprising generating the first and second symbol sequences by applying an unequal error protection scheme to input data including data bits which have different priorities,
wherein priority of data bits corresponding to the first symbol sequence is higher than the priority of data bits corresponding to the second symbol sequence.

19. A receiver, comprising:
a reception unit configured to receive a wireless signal via N reception antennas and to output the N received signals, N being a natural number; and
a symbol detection unit configured to detect at least one symbol sequence based on the N received signals,
wherein the wireless signal includes a signal transmitted from first to M-th transmission antennas, where M is a natural number≥2,
wherein the signal transmitted from the m-th transmission antenna, m being an arbitrary natural number between 1 and M, includes a signal generated from combining a m-th encoded symbol sequence generated according to first to L-th multiple antenna transmission schemes, L being a natural number≥2, wherein an l-th, multiple antenna transmission scheme encodes an l-th symbol sequence to thereby generate first to M-th encoded symbol sequences, l being an arbitrary natural number between 1 and L, and wherein the multiple antenna transmission schemes includes a scheme for enabling a first receiver having a first reception antenna to perform decoding and a scheme for enabling a second receiver having a plurality of second reception antennas to perform decoding.

20. The receiver of claim 19, wherein N is equal to or greater than 2, and wherein the symbol detection unit comprises:

a first decoder configured to detect a first symbol sequence by decoding the N received signals according to a decoding scheme corresponding to a first multiple antenna transmission scheme; and a second decoder configured to detect a second symbol sequence by decoding a signal obtained by removing signal components of the first symbol sequence from the N received signals, according to a decoding scheme corresponding to a second multiple antenna transmission scheme.

* * * * *